United States Patent
Huang et al.

(10) Patent No.: US 12,389,048 B2
(45) Date of Patent: Aug. 12, 2025

(54) LIVE STREAMING METHOD AND APPARATUS, AND COMPUTER DEVICE AND STORAGE MEDIUM

(71) Applicant: BEIJING YOUZHUJU NETWORK TECHNOLOGY CO., LTD., Beijing (CN)

(72) Inventors: Junming Huang, Beijing (CN); Gehang Li, Beijing (CN); Changwen Chen, Beijing (CN); Shaoze Xie, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/277,217

(22) PCT Filed: Apr. 8, 2022

(86) PCT No.: PCT/CN2022/085856
§ 371 (c)(1),
(2) Date: Aug. 14, 2023

(87) PCT Pub. No.: WO2022/237414
PCT Pub. Date: Nov. 17, 2022

(65) Prior Publication Data
US 2024/0129557 A1    Apr. 18, 2024

(30) Foreign Application Priority Data

May 8, 2021   (CN) .......................... 202110500138.8

(51) Int. Cl.
*H04N 21/218*    (2011.01)
*H04N 21/2187*   (2011.01)
(Continued)

(52) U.S. Cl.
CPC ....... *H04N 21/2187* (2013.01); *H04N 21/431* (2013.01); *H04N 21/47205* (2013.01)

(58) Field of Classification Search
CPC ............. H04N 21/2187; H04N 21/431; H04N 21/47205
(Continued)

(56) References Cited

U.S. PATENT DOCUMENTS 11,823,311 B2 * 11/2023 Li ..................... H04N 21/2187
2004/0246951 A1  12/2004 Parker et al.
(Continued)

FOREIGN PATENT DOCUMENTS

| CN | 106254899 A | 12/2016 |
| CN | 106406998 A | 2/2017 |

(Continued)

OTHER PUBLICATIONS

International Patent Application No. PCT/CN2022/085856; Int'l Search Report; dated Jun. 29, 2022; 3 pages.

*Primary Examiner* — Dominic D Saltarelli
(74) *Attorney, Agent, or Firm* — BakerHostetler

(57) ABSTRACT

Provided in the present disclosure are a live streaming method and apparatus, and a computer device and a storage medium. The method comprises: in response to a live streaming request that is initiated in a first sub-program interface displayed in a target application program, performing push-stream live streaming on the first sub-program interface on the basis of a live streaming process; receiving interaction data sent by a server, sending the interaction data to a sub-program process that has a connection relationship with the live streaming process, and displaying the interaction data on the first sub-program interface; and in response to a sub-program switching operation, receiving the interaction data by means of a second sub-program process (Continued)

which is switched to, and displaying the interaction data on a second sub-program interface.

20 Claims, 3 Drawing Sheets

(51) Int. Cl.
*H04N 21/431* (2011.01)
*H04N 21/472* (2011.01)

(58) Field of Classification Search
USPC .......................................................... 725/109
See application file for complete search history.

(56) References Cited

U.S. PATENT DOCUMENTS

| | | |
|---|---|---|
| 2015/0304605 A1 | 10/2015 | Hartman et al. |
| 2019/0335083 A1 | 10/2019 | Digiantomasso et al. |
| 2022/0345755 A1* | 10/2022 | Pollock .................. G06V 20/41 |

FOREIGN PATENT DOCUMENTS

| | | | | |
|---|---|---|---|---|
| CN | 107613313 A | 1/2018 | | |
| CN | 109246442 A | 1/2019 | | |
| CN | 109831673 A | 5/2019 | | |
| CN | 112738608 A | 4/2021 | | |
| CN | 112770172 A | 5/2021 | | |
| CN | 113242441 A | 8/2021 | | |
| CN | 111836066 B * | 6/2024 | ......... H04N 21/2187 |
| WO | WO 2020/200302 A1 | 10/2020 | | |

* cited by examiner

LIVE STREAMING METHOD AND APPARATUS, AND COMPUTER DEVICE AND STORAGE MEDIUM

CROSS REFERENCE TO RELATED APPLICATIONS

The present application is the U.S. National Stage of International Application No. PCT/CN2022/085856, titled "LIVE STREAMING METHOD AND APPARATUS, AND COMPUTER DEVICE AND STORAGE MEDIUM", filed on Apr. 8, 2022, which claims priority to Chinese Patent Application No. 202110500138.8, filed on May 8, 2021 and entitled "LIVE STREAMING METHOD AND APPARATUS, AND COMPUTER DEVICE AND STORAGE MEDIUM", the entire contents of both of which are incorporated herein by reference.

TECHNICAL FIELD

The present disclosure relates to the field of Internet technologies, and in particular, to a live streaming method and apparatus, a computer device, and a storage medium.

BACKGROUND

With the development of Internet technologies, the concept of live streaming has undergone new expansion and development. Compared with single past time and space of movies, live streaming may show both present and past time and space. More and more people are paying attention to on-line live streaming. Optimization of live streaming is also receiving increasing attention from research and development personnel.

SUMMARY

Embodiments of the disclosure provide a live streaming method and apparatus, a computer device, and a storage medium.

In a first aspect, an embodiment of the disclosure provides a live streaming method, the live streaming method comprises: responding to a live streaming request initiated on a first subroutine interface displayed in a target application, and performing push live streaming on the first subroutine interface based on a live streaming process; receiving interactive data sent by a server, sending the interactive data to subroutine processes having a connection relationship with the live streaming process, and displaying the interactive data on the first subroutine interface, wherein the subroutine processes having a connection relationship with the live streaming process comprise a first subroutine process; and responding to a subroutine switching operation and displaying, on a second subroutine interface, the interactive data received through a second subroutine process after switching, wherein the second subroutine process has a connection relationship with the live streaming process.

In one possible implementation, the method further comprises: determining all activated subroutine processes before responding to the live streaming request initiated on the first subroutine interface displayed in the target application; and establishing a connection between the live streaming process and the activated subroutine processes to perform push live streaming on subroutine interfaces corresponding to the activated subroutine processes through the live streaming process; sending the interactive data to subroutine processes having a connection relationship with the live streaming process comprises: sending the interactive data to the activated subroutine processes.

In one possible implementation, after receiving the interactive data sent by the server, the method further comprises: storing the interactive data in the live streaming process; responding to activation of a third subroutine, and displaying a third subroutine interface; and sending the interactive data stored in the live streaming process to a third subroutine process to display the interactive data on the third subroutine interface.

In one possible implementation, the method further comprises: detecting a display status of each currently activated subroutine interface, the display status being used to represent whether the subroutine interface is displayed; determining a last pushed video frame when the display statuses of all subroutine interfaces are non-display; and performing the push live streaming based on the last pushed video frame.

In one possible implementation, performing push live streaming on the first subroutine interface based on the live streaming process comprises: collecting audio and video data on the first subroutine interface based on an audio and video data collection process corresponding to a first subroutine; and sending the audio and video data from the audio and video data collection process to the live streaming process, and performing the push live streaming on the audio and video data based on the live streaming process.

In one possible implementation, the method further comprises: controlling a microphone to collect other audio data; and sending the other audio data to the live streaming process; performing the push live streaming on the audio and video data based on the live streaming process comprises: fusing the audio and video data with the other audio data; and performing the push live streaming on the fused audio and video data based on the live streaming process.

In one possible implementation, sending the audio and video data from the first subroutine process to the live streaming process comprises: packaging and/or compressing the audio and video data, and sending the processed audio and video data from the first subroutine process to the live streaming process.

In a second aspect, another embodiment of the disclosure provides a live streaming apparatus, the live streaming apparatus comprises: a live streaming module configured to respond to a live streaming request initiated on a first subroutine interface displayed in a target application, and perform push live streaming on the first subroutine interface based on a live streaming process; a processing module configured to receive interactive data sent by a server, send the interactive data to subroutine processes having a connection relationship with the live streaming process, and display the interactive data on the first subroutine interface, wherein the subroutine processes having a connection relationship with the live streaming process comprise a first subroutine process; and a display module configured to respond to a subroutine switching operation and display, on a second subroutine interface, the interactive data received through a second subroutine process after switching, wherein the second subroutine process has a connection relationship with the live streaming process.

In one possible implementation, the live streaming module is further configured to: determine all activated subroutine processes before responding to the live streaming request initiated on the first subroutine interface displayed in the target application; and establish a connection between the live streaming process and the activated subroutine processes to perform push live streaming on subroutine interfaces corresponding to the activated subroutine processes through the live streaming process; when send the interactive data to subroutine processes having a connection relationship with the live streaming process, the processing module is configured to: send the interactive data to the activated subroutine processes.

In one possible implementation, after receiving the interactive data sent by the server, the processing module is further configured to: store the interactive data in the live streaming process; respond to activation of a third subroutine, and display a third subroutine interface; and send the interactive data stored in the live streaming process to a third subroutine process to display the interactive data on the third subroutine interface.

In one possible implementation, the live streaming module is further configured to: detect a display status of each currently activated subroutine interface, the display status being used to represent whether the subroutine interface is displayed; determine a last pushed video frame when the display statuses of all subroutine interfaces are non-display; and perform the push live streaming based on the last pushed video frame.

In one possible implementation, when perform push live streaming on the first subroutine interface based on the live streaming process, the live streaming module is configured to: collect audio and video data on the first subroutine interface based on an audio and video data collection process corresponding to a first subroutine; and send the audio and video data from the audio and video data collection process to the live streaming process, and perform the push live streaming on the audio and video data based on the live streaming process.

In one possible implementation, the live streaming module is further configured to: control a microphone to collect other audio data; and send the other audio data to the live streaming process; when perform the push live streaming on the audio and video data based on the live streaming process, the live streaming module is further configured to: fuse the audio and video data with the other audio data; and perform the push live streaming on the fused audio and video data based on the live streaming process.

In one possible implementation, when send the audio and video data from the first subroutine process to the live streaming process, the live streaming module is further configured to: package and/or compress the audio and video data, and send the processed audio and video data from the first subroutine process to the live streaming process.

In a third aspect, another embodiment of the disclosure provides a computer device, the computer device comprises a processor, a memory, and a bus, wherein the memory stores machine-readable instructions executable by the processor, the processor communicates with the memory through the bus when the computer device runs, and the machine-readable instructions, when executed by the processor, cause the processor to perform the steps of any one of the above possible implementations.

In a fourth aspect, another embodiment of the disclosure provides a computer-readable storage medium, wherein the computer-readable storage medium stores a computer program, and the computer program, when run by a processor, cause the processor to perform the steps of any one of the above possible implementations.

In the live streaming method provided in the embodiments of the present disclosure, a live streaming request may be directly initiated on a first subroutine interface of a target application, and push live streaming may be performed on the first subroutine interface. In this way, audio and video data on the first subroutine interface may be directly obtained through a first subroutine process. Compared with conventional live streaming methods, the present disclosure provides a novel live streaming method with simpler operation.

Further, in the live streaming method provided in the present disclosure, after interactive data sent by a server are received, the interactive data may be sent to subroutine processes (including a first subroutine process and a second subroutine process) having a connection relationship with a live streaming process. In this way, the interactive data may not only be displayed on the first subroutine interface, but also directly displayed on a second subroutine interface after switched to a second subroutine, thereby ensuring uninterrupted display of the interactive data, and simplifying a live streaming enabling method on an anchor side without changing a live streaming method on the anchor side and viewing habits of a user side.

In order to make the above objectives, features, and advantages of this disclosure more apparent and understandable, preferred embodiments are provided, and in conjunction with the accompanying drawings, provides a detailed explanation as follows.

BRIEF DESCRIPTION OF THE DRAWINGS

In order to provide a clearer explanation of the technical solution of the disclosed embodiments, a brief introduction will be given to the accompanying drawings required in the embodiments. The accompanying drawings are incorporated into the specification and in constitute of a part of the specification. These drawings illustrate embodiments that comply with the present disclosure and are used together with the specification to illustrate the technical solution of the present disclosure. It should be understood that the following drawings only illustrate certain embodiments of the present disclosure, and therefore should not be regarded as limiting the scope. For ordinary technical personnel in the art, other relevant drawings can also be obtained based on these drawings without creative labor.

DETAILED DESCRIPTION OF PREFERRED EMBODIMENTS

Figure 1:
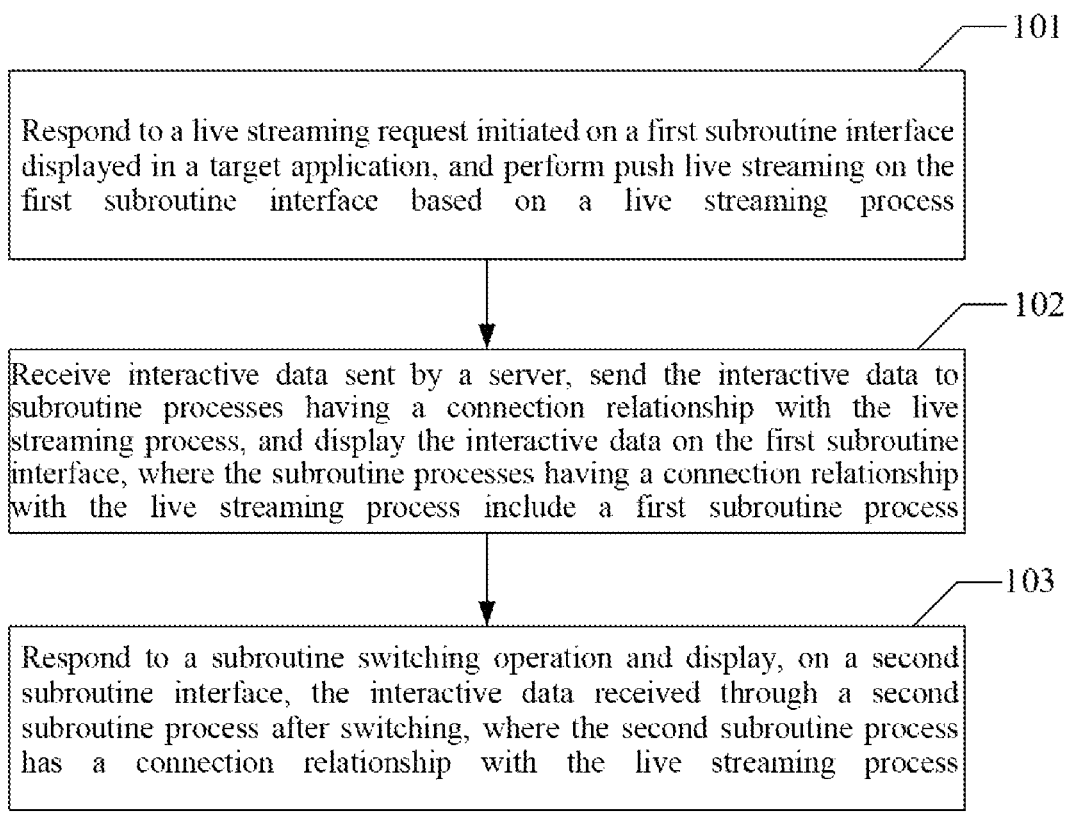
FIG. 1 shows a flowchart of a live streaming method according to an embodiment of the present disclosure.

In order to make the purpose, technical solution, and advantages of the disclosed embodiments clearer, the following will provide a clear and complete description of the technical solution in the disclosed embodiments in conjunction with the accompanying drawings. Obviously, the described embodiments are only a part of the disclosed embodiments, not all of them. The components of the present disclosed embodiment, typically described and shown in the accompanying drawings, can be arranged and designed in various different configurations. Therefore, the detailed description of the embodiments of the present disclosure provided in the accompanying drawings is not intended to limit the scope of the claimed protection, but only to represent the selected embodiments of the present disclosure. Based on the disclosed embodiments, all other embodiments obtained by those skilled in the art without creative labor fall within the scope of protection of this disclosure.

Through research, it was found that with the development of Internet technologies, the concept of live streaming has undergone new expansion and development. Compared with single past time and space of movies, live streaming may show both present and past time and space. More and more people are paying attention to on-line live streaming. Optimization of live streaming is also receiving increasing attention from research and development personnel.

Generally, live streaming relies on separate live streaming software in related technologies. After the live streaming software is opened, content that needs to be live streamed is live streamed by recording on a screen.

Unlike the live streaming method in the related technologies, embodiments of the present disclosure provide a live streaming method in which a live streaming request may be directly initiated on a first subroutine interface of a target application and push live streaming may be performed on the first subroutine interface. In this way, audio and video data on the first subroutine interface may be directly obtained through a first subroutine process. Compared with conventional live streaming methods, the present disclosure provides a novel live streaming method with simpler operation.

Further, in the live streaming method provided in the present disclosure, after interactive data sent by a server are received, the interactive data may be sent to subroutine processes (including a first subroutine process and a second subroutine process) having a connection relationship with a live streaming process. In this way, the interactive data may not only be displayed on the first subroutine interface, but also directly displayed on a second subroutine interface after switched to a second subroutine, thereby ensuring uninterrupted display of the interactive data, and simplifying a live streaming enabling method on an anchor side without changing a live streaming method on the anchor side and viewing habits of a user side.

The shortcomings of the above solutions are all the results obtained after inventor's practice and careful study. Therefore, the discovery process of the foregoing problems and solutions provided below by the present disclosure against the problems should all be the contributions made by the inventor to the present disclosure.

It should be noted that similar reference signs and letters in the following drawings represent similar terms, so once a term is defined in a drawing, further discussion on this term is not required in the follow-up drawings.

For the convenience of understanding the embodiments, a live streaming method disclosed in the embodiments of the present disclosure is first described in detail. An executive subject for the live streaming method provided in the embodiments of the present disclosure is generally a terminal device with some computing capability. The terminal device is generally a device with a display, such as a smart phone, a tablet computer, or a personal computer.

Herein, the first subroutine process is a process corresponding to the first subroutine, and the first subroutine interface is a display interface corresponding to the first subroutine; the second subroutine process is a process corresponding to the second subroutine, and the second subroutine interface is a display interface corresponding to the second subroutine; and the first subroutine and the second subroutine are both subroutines in a target application, and the subroutines in the target application are routines that do not require installation, for example, small routines.

FIG. 1 shows a flowchart of a live streaming method according to an embodiment of the present disclosure. The method includes steps 101 to 103.

Step 101: Respond to a live streaming request initiated on a first subroutine interface displayed in a target application, and perform push live streaming on the first subroutine interface based on a live streaming process.

Step 102: Receive interactive data sent by a server, send the interactive data to subroutine processes having a connection relationship with the live streaming process, and display the interactive data on the first subroutine interface, where the subroutine processes having a connection relationship with the live streaming process include a first subroutine process.

Step 103: Respond to a subroutine switching operation and display, on a second subroutine interface, the interactive data received through a second subroutine process after switching, where the second subroutine process has a connection relationship with the live streaming process.

The following describes the foregoing steps in detail.
For Step 101:

In one possible implementation, page data corresponding to the first subroutine interface may be displayed in response to a target trigger operation acting on a target application interface. Here, the target trigger operation may be a trigger operation for a target application, for example, a trigger operation for an entry of the first subroutine interface after a pull-down operation on a main interface of the target application, The trigger operation may include but is not limited to click, double click, long press, repress, and the like. Alternatively, the target trigger operation may directly be any of the foregoing trigger operations acting on the main interface of the target application. For example, if the main interface of the target application is directly repressed, the first subroutine interface is displayed.

In one possible implementation, the live streaming request may be an instruction generated after a target button on the first subroutine interface is triggered. For example, when the first subroutine interface is displayed, the displayed interface may be shown in FIG. 2. An "Experience a new "game watching" function" pop-up window may be added to the displayed interface, and a live streaming instruction may be generated after a user clicks "enable the microphone".

The user may click a "Synchronously enable the microphone" selection button below to collect other sound data through the microphone in the live streaming process. If the user does not click the "Synchronously enable the microphone" selection button below, audio and video data pushed in the live streaming process only include audio and video data on the first subroutine interface.

In addition, the user may click a "Temporarily not enabled" button at the upper right corner to choose only to play games without live streaming.

In one possible implementation, when the push live streaming is performed on the first subroutine interface based on the live streaming process, the audio and video data on the first subroutine interface may be first collected based on an audio and video data collection process corresponding to a first subroutine, then the audio and video data may be sent from the audio and video data collection process to the live streaming process, and the push live streaming is performed on the audio and video data based on the live streaming process.

The audio and video data collection process may include a screen rendering thread, a video data collection thread, an audio playback thread, an audio data collection thread, and the like.

Specifically, when the audio and video data on the first subroutine interface are collected and the first subroutine interface is displayed, the screen rendering thread may be activated to render video data on the first subroutine interface, and the video data on the first subroutine interface may be synchronously rendered onto a created texture based on the screen rendering thread; and then texture data on the texture, namely, the video data, are periodically obtained based on the video data collection thread.

When the first subroutine interface is displayed, the audio playback thread also needs to be activated simultaneously to play the audio data in the first subroutine interface, and the audio data in the first subroutine interface may be collected simultaneously based on the audio playback thread; and then the audio data are periodically collected based on the audio data collection thread.

Figure 2:
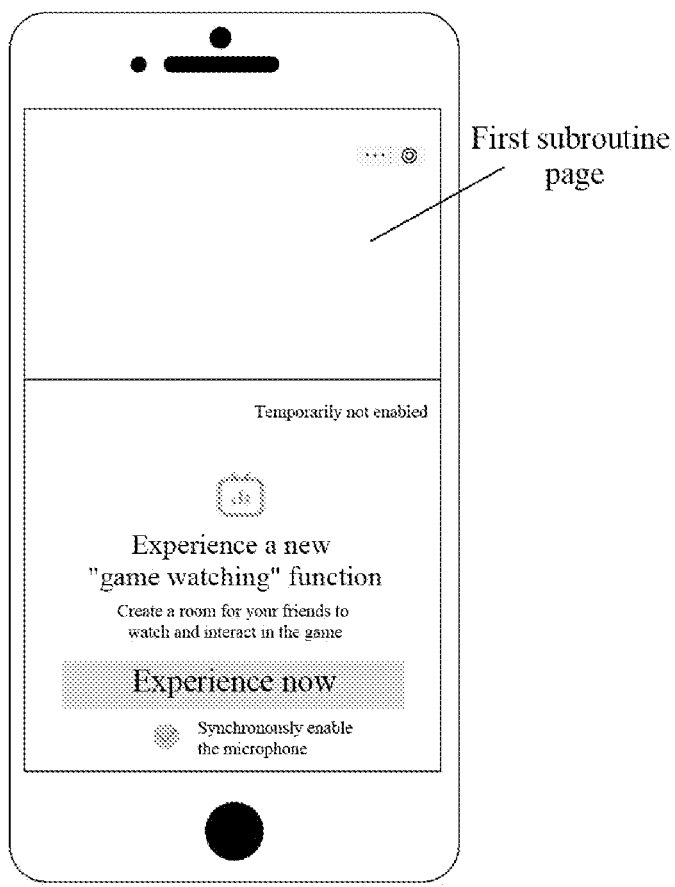
FIG. 2 shows a schematic diagram of a first subroutine interface in the live streaming method according to an embodiment of the present disclosure.

If the user clicks the "Synchronously enable the microphone" selection button described in FIG. 2, the microphone may be controlled through the first subroutine process to collect other audio data; and then the other audio data are sent from the first subroutine process to the live streaming process. When the push live streaming is performed on the audio and video data based on the live streaming process, the audio and video data may be first fused with the other audio data, then the fused audio and video data are sent to the live streaming process, and the push live streaming is performed on the fused audio and video data based on the live streaming process.

When the audio and video data are fused with the other audio data, the audio data in the audio and video data may be fused with the other audio data. Because the audio playback thread and the microphone collect audio data simultaneously, when the audio data are fused with the other audio data, the audio data collected by the audio playback thread may be directly fused, based on a timestamp corresponding to the collected audio data, with the other audio data collected by the microphone to obtain fused audio data.

Here, the other audio data collected by the microphone may be understood as data of outside sound, but not sound produced by an electronic device that performs the method provided in the present disclosure. In practical applications, the microphone is mainly used to collect sound of an anchor on the anchor side.

In one possible implementation, when the audio and video data are sent from the first subroutine process to the live streaming process, the audio and video data may be packaged and/or compressed in order to improve cross-process data transmission efficiency and reduce resource consumption caused by cross-process data transmission, and then the processed audio and video data are sent from the first subroutine process to the live streaming process.

Here, the compression generally processes the video data.

The live streaming process may be a new process established after responding to the live streaming request initiated on the first subroutine interface displayed in the target application, or may refer to a main process of the target application. The main process of the target application may include a live streaming module. The live streaming module is activated after responding to the live streaming request initiated on the first subroutine interface displayed in the target application, and the main process is used as the live streaming process.

For Step 102:

In one possible implementation, the interactive data may refer to virtual gifts, barrage information, and the like, or the interactive data may be data sent by any audience side to interact with the anchor in the live streaming process.

The subroutine processes having a connection relationship with the live streaming process may refer to all activated subroutine processes before responding to the live streaming request initiated on the first subroutine interface displayed in the target application. After responding to the live streaming request initiated on the first subroutine interface displayed in the target application, a connection may be established between the live streaming process and all current activated subroutine processes. Here, all the current activated subroutine processes include the first subroutine process and other subroutine processes running in the background.

The connection is established between the live streaming process and the other subroutine processes to transmit the audio and video data of the other subroutine processes across to the live streaming process. For example, a live streaming process LocalSocketServer service may be pulled up through Binder communication. After the service is pulled up, the connection between the live streaming process and the subroutine process may be established.

When the interactive data are sent to the subroutine processes having a connection relationship with the live streaming process, the interactive data may be sent to the activated subroutine processes.

In practical applications, interactive data periodically sent by the server may be received, and then the interactive data are displayed based on time information when the interactive data are sent to the server. For example, the interactive data sent last are displayed at the bottom.

In one possible implementation, when the interactive data are displayed on the first subroutine interface, the interactive data may be displayed in a superimposed manner at preset position areas of the first subroutine interface, and different interactive data may correspond to different preset position areas.

It should be noted that the interactive data do not belong to the audio and video data of the first subroutine interface itself, so even if the interactive data are displayed in the superimposed manner on the first subroutine interface, the displayed interactive data will not be live streamed when the push live streaming is performed on the first subroutine interface.

In one possible implementation, when the interactive data are displayed in the superimposed manner on the first subroutine interface, a UI component may be added to the first subroutine interface, the UI component being used to display the interactive data. The UI component may support sliding up and down for the anchor side to view historical interactive data, and support a drag operation. The user may drag the UI component to any position, to prevent the displayed interactive data from affecting the operation of the anchor on the first subroutine interface.

For Step 103:

Here, the response to the subroutine switching operation may be detected switching from the currently displayed first subroutine interface to other activated but not displayed subroutine process interfaces. For example, a display status of each activated subroutine interface may be determined, the display status being used to represent whether the subroutine interface is currently displayed. When it is detected that the display status of the first subroutine interface is "non-display", and the display status of another second subroutine interface is switched from "non-display" to "display", it may be determined that the user has performed the subroutine switching operation.

The interactive data are sent to other activated but not displayed subroutine processes in addition to the first subroutine process, so when the first subroutine interface is switched to the second subroutine interface, the second subroutine process has the interactive data. Therefore, the interactive data may be directly displayed to ensure uninterrupted display of the interactive data.

Further, in a subroutine switching process, the display status of any subroutine interface may be "non-display". For example, in a case that the user switches the target application to the background or the user displays the switched interface for a long time, in order to ensure uninterrupted live streaming for the audience side, a last pushed video frame may be determined, and then the push live streaming may be performed based on the last video frame, that is, the last video frame is repeatedly sent to the server.

Here, the last video frame may be the one of the subroutine process in a display status of "display" in the pushing process.

When the push live streaming is performed based on the last video frame, other audio data may be collected through the microphone, and the last video frame and the other audio data may be synchronously pushed to the server.

In another possible implementation, after the interactive data sent by the server are received, the interactive data may alternatively be stored in the live streaming process. When it is detected that a third subroutine is activated and a third subroutine interface is displayed, because the third subroutine process has not been connected with the live streaming process before, the third subroutine process has not received the interactive data before. In this case, the live streaming process needs to send the stored interactive data to the third subroutine process to display the interactive data on the third subroutine interface.

In another possible implementation, the live streaming process may also detect survival of each subroutine process, and when it is detected that all subroutine processes are closed, the live streaming process is closed.

A person skilled in the art may understand that, in the foregoing method of specific implementations, the writing order of steps does not imply a strict execution order and imposes any restriction on the implementation process, and the specific execution order of the steps should be determined based on their functions and possible internal logic.

Based on the same inventive concept, an embodiment of the present disclosure further provides a live streaming apparatus corresponding to the live streaming method. Because the principle of solving problems by the apparatus in this embodiment of the present disclosure is similar to that by the foregoing live streaming method in the embodiments of the present disclosure, the implementation of the apparatus may refer to the implementation of the method, and any repetition will not be repeated.

Figure 3:
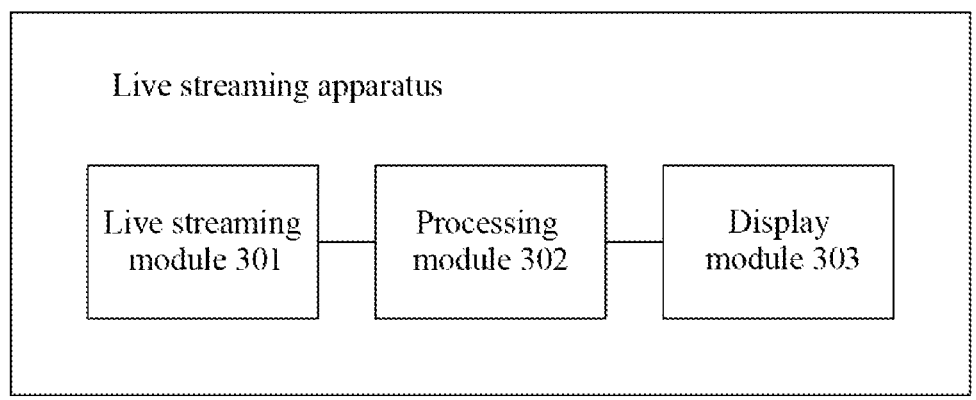
FIG. 3 shows a schematic diagram of an architecture of a live streaming apparatus according to an embodiment of the present disclosure.

FIG. 3 shows a schematic diagram of an architecture of a live streaming apparatus according to an embodiment of the present disclosure. The apparatus includes: a live streaming module 301, a processing module 302, and a display module 303, wherein:

the live streaming module 301 is configured to respond to a live streaming request initiated on a first subroutine interface displayed in a target application, and perform push live streaming on the first subroutine interface based on a live streaming process;

the processing module 302 is configured to receive interactive data sent by a server, send the interactive data to subroutine processes having a connection relationship with the live streaming process, and display the interactive data on the first subroutine interface, where the subroutine processes having a connection relationship with the live streaming process include a first subroutine process; and the display module 303 is configured to respond to a subroutine switching operation and display, on a second subroutine interface, the interactive data received through a second subroutine process after switching, where the second subroutine process has a connection relationship with the live streaming process.

In one possible implementation, the live streaming module 301 is further configured to:
determine all activated subroutine processes before responding to the live streaming request initiated on the first subroutine interface displayed in the target application; and
establish a connection between the live streaming process and the activated subroutine processes to perform push live streaming on subroutine interfaces corresponding to the activated subroutine processes through the live streaming process;
when sending the interactive data to subroutine processes having a connection relationship with the live streaming process, the processing module 302 is configured to:
send the interactive data to the activated subroutine processes.

In one possible implementation, after receiving the interactive data sent by the server, the processing module 302 is further configured to:
store the interactive data in the live streaming process;
respond to activation of a third subroutine, and display a third subroutine interface; and
send the interactive data stored in the live streaming process to a third subroutine process to display the interactive data on the third subroutine interface.

In one possible implementation, the live streaming module 301 is further configured to:
detect a display status of each currently activated subroutine interface, the display status being used to represent whether the subroutine interface is displayed;
determine a last pushed video frame when the display statuses of all subroutine interfaces are non-display; and
perform the push live streaming based on the last video frame.

In one possible implementation, when performing the push live streaming on the first subroutine interface based on the live streaming process, the live streaming module 301 is configured to:
collect audio and video data on the first subroutine interface based on an audio and video data collection process corresponding to a first subroutine; and
send the audio and video data from the audio and video data collection process to the live streaming process, and perform the push live streaming on the audio and video data based on the live streaming process.

In one possible implementation, the live streaming module 301 is further configured to:
control a microphone to collect other audio data; and
send the other audio data to the live streaming process;

when performing the push live streaming on the audio and video data based on the live streaming process, the live streaming module 301 is configured to:
fuse the audio and video data with the other audio data; and
perform the push live streaming on the fused audio and video data based on the live streaming process.

In one possible implementation, when sending the audio and video data from the first subroutine process to the live streaming process, the live streaming module 301 is configured to:
package and/or compress the audio and video data, and send the processed audio and video data from the first subroutine process to the live streaming process.

Descriptions of the processing flow of each module and the interaction flow between modules in the apparatus may refer to the relevant instructions in the foregoing method embodiments, and details are not provided here.

Figure 4:
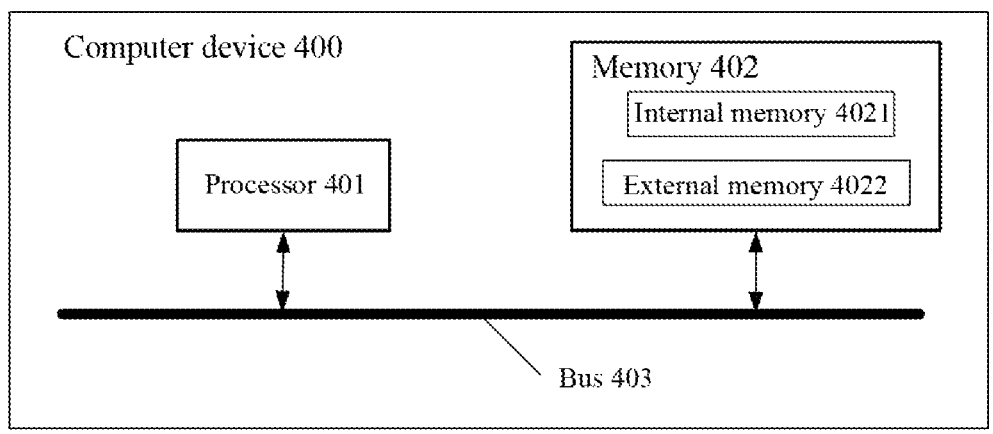
FIG. 4 shows a schematic structural diagram of a computer device according to an embodiment of the present disclosure.

Based on the same technical concept, an embodiment of the present disclosure further provides a computer device. FIG. 4 shows a schematic structural diagram of a computer device 400 according to an embodiment of the present disclosure, including a processor 401, a memory 402, and a bus 403. The memory 402 is configured to store executable instructions, and includes an internal memory 4021 and an external memory 4022. The internal memory 4021 is configured to temporarily store operational data in the processor 401 and data exchanged with the external memory 4022 such as a hard disk. The processor 401 exchanges data with the external memory 4022 through the internal memory 4021. When the computer device 400 runs, the processor 401 communicates with the memory 402 through the bus 403, and the processor 401 is enabled to execute the following instructions:
responding to a live streaming request initiated on a first subroutine interface displayed in a target application, and performing push live streaming on the first subroutine interface based on a live streaming process;
receiving interactive data sent by a server, sending the interactive data to subroutine processes having a connection relationship with the live streaming process, and displaying the interactive data on the first subroutine interface, where the subroutine processes having a connection relationship with the live streaming process include a first subroutine process; and
responding to a subroutine switching operation and displaying, on a second subroutine interface, the interactive data received through a second subroutine process after switching, where the second subroutine process has a connection relationship with the live streaming process.

In one possible implementation, the instructions executed by the processor 401 further include:
determining all activated subroutine processes before responding to the live streaming request initiated on the first subroutine interface displayed in the target application; and
establishing a connection between the live streaming process and the activated subroutine processes to perform push live streaming corresponding to the activated subroutine processes through the live streaming process;
the sending the interactive data to subroutine processes having a connection relationship with the live streaming process includes:
sending the interactive data to the activated subroutine processes.

In one possible implementation, in the instructions executed by processor 401, after receiving the interactive data sent by the server, the method further includes:
storing the interactive data in the live streaming process;
responding activation of a third subroutine, and displaying a third subroutine interface; and
sending the interactive data stored in the live streaming process to a third subroutine process to display the interactive data on the third subroutine interface.

In one possible implementation, the instructions executed by processor 401 further include:
detecting a display status of each currently activated subroutine interface, the display status being used to represent whether the subroutine interface is displayed;
determining a last pushed video frame when the display statuses of all subroutine interfaces are non-display; and
performing the push live streaming based on the last video frame.

In one possible implementation, in the instructions executed by processor 401, the performing push live streaming on a first subroutine interface based on a live streaming process includes:
collecting audio and video data on the first subroutine interface based on an audio and video data collection process corresponding to a first subroutine; and
sending the audio and video data from the audio and video data collection process to the live streaming process, and performing the push live streaming on the audio and video data based on the live streaming process.

In one possible implementation, in the instructions executed by the processor 401, the method further includes:
controlling a microphone to collect other audio data; and
sending the other audio data to the live streaming process;
the performing the push live streaming on the audio and video data based on the live streaming process includes:
fusing the audio and video data with the other audio data; and
performing the push live streaming on the fused audio and video data based on the live streaming process.

In one possible implementation, in the instructions executed by the processor 401, sending the audio and video data from the first subroutine process to the live streaming process includes:
packaging and/or compressing the audio and video data, and sending the processed audio and video data from the first subroutine process to the live streaming process.

An embodiment of the present disclosure further provides a computer-readable storage medium, the computer-readable storage medium storing a computer program, and the steps of the live streaming method described in the foregoing method embodiment being performed when the computer program is executed by a processor. The storage medium may be a volatile or non-volatile computer-readable storage medium.

An embodiment of the present disclosure further provides a computer program product, the computer program product carrying program code, where instructions included in the program code may be used to perform the steps of the live streaming method described in the foregoing method embodiment. Details may refer to the foregoing method embodiment and will not be repeated here.

The above-mentioned computer program products can be specifically implemented through hardware, software, or a combination thereof. In one optional embodiment, the computer program product is specifically embodied as a computer storage medium, while in another optional embodiment, the computer program product is specifically embodied as a software product, such as a Software Development Kit (SDK), etc.

Technicians in the field can clearly understand that for the convenience and conciseness of the description, the specific working process of the system and device described above can refer to the corresponding processes in the aforementioned method embodiments, and will not be repeated here. In the several embodiments provided in this disclosure, it should be understood that the disclosed systems, devices, and methods can be implemented in other ways. The device embodiments described above are only schematic. For example, the division of the units is only a logical functional division, and there may be other division methods in actual implementation. For example, multiple units or components can be combined or integrated into another system, or some features can be ignored or not executed. On the other hand, the coupling or direct coupling or communication connection displayed or discussed between each other can be indirect coupling or communication connection through some communication interfaces, devices or units, which can be in the form of electrical, mechanical or other forms.

The units described as separate components can be or may not be physically separated, and the components displayed as units can be or may not be physical units, that is, they can be located in one place or distributed across multiple network units. Some or all of the units can be selected according to actual needs to achieve the purpose of this embodiment.

In addition, in various embodiments of the present disclosure, each functional unit can be integrated into a single processing unit, each unit can physically exist separately, or two or more units can be integrated into one unit.

If the function is implemented in the form of a software functional unit and sold or used as an independent product, it can be stored in a non-volatile computer readable storage medium that can be executed by a processor. Based on this understanding, the disclosed technical solution, in essence, or the portion that contributes to the existing technology or the portion of the technical solution, can be reflected in the form of a software product, which is stored in a storage medium, Including several instructions to enable a computer device (which can be a personal computer, server, or network device, etc.) to perform all or part of the steps of the methods described in various embodiments of the present disclosure. The aforementioned storage media include: USB flash disk, Portable storage device, read only memory (ROM), Random-access memory (RAM), disk or optical disc and other media that can store Stored procedure codes.

Finally, it should be noted that the above embodiments are only specific embodiments of the present disclosure, intended to illustrate the technical solution disclosed in the present disclosure, rather than limiting it. The scope of protection of the present disclosure is not limited to this. Although detailed explanations of the present disclosure have been provided by referring to the aforementioned embodiments, ordinary technical personnel in the art should understand that any person familiar with the technical field within the scope of the disclosed technology, It can still modify the technical solution recorded in the aforementioned embodiments or easily think of changes, or equivalently replace some of the technical features; And these modifications, changes, or substitutions do not separate the essence of the corresponding technical solution from the spirit and scope of the disclosed embodiment technical solution, and should be covered within the scope of protection of this disclosure. Therefore, the scope of protection disclosed in this disclosure shall be based on the scope of claims.

What is claimed is:

1. A live streaming method, comprising:
   implementing push live streaming on a first subroutine interface in response to an initiation by a streamer directly received via the first subroutine interface displayed in a target application associated with a live streaming process, wherein the implementing push live streaming on the first subroutine interface comprises directly obtaining video and audio data through a first subroutine process associated with the first subroutine interface;
   receiving interactive data sent by a server, wherein the interactive data are sent to subroutine processes that have established connections with the live streaming process, and wherein the subroutine processes comprise the first subroutine process and a second subroutine process associated with a second subroutine interface;
   displaying the interactive data on the first subroutine interface, wherein the interactive data comprise data sent from an audience to interact with the streamer;
   determining whether a subroutine switching operation of switching the first subroutine interface to the second subroutine interface has been performed based on detecting a display status of the first subroutine interface and a display status of the second subroutine interface; and
   implementing uninterrupted display of the interactive data by directly displaying, on the second subroutine interface, the interactive data received through the second subroutine process in response to determining that the subroutine switching operation has been performed.

2. The method according to claim 1, wherein the method further comprises:
   determining all activated subroutine processes before responding to the live streaming request initiated on the first subroutine interface displayed in the target application; and
   establishing a connection between the live streaming process and the activated subroutine processes to perform push live streaming on subroutine interfaces corresponding to the activated subroutine processes through the live streaming process;
   sending the interactive data to subroutine processes having a connection relationship with the live streaming process comprises:
   sending the interactive data to the activated subroutine processes.

3. The method according to claim 1, wherein after receiving the interactive data sent by the server, the method further comprises:
   storing the interactive data in the live streaming process;
   responding to activation of a third subroutine, and displaying a third subroutine interface; and
   sending the interactive data stored in the live streaming process to a third subroutine process to display the interactive data on the third subroutine interface.

4. The method according to claim 1, wherein the method further comprises:
   detecting a display status of each currently activated subroutine interface, the display status being used to represent whether the subroutine interface is displayed;

determining a last pushed video frame when the display statuses of all subroutine interfaces are non-display; and performing the push live streaming based on the last pushed video frame.

5. The method according to claim 1, wherein performing push live streaming on the first subroutine interface based on the live streaming process comprises:

collecting audio and video data on the first subroutine interface based on an audio and video data collection process corresponding to a first subroutine; and sending the audio and video data from the audio and video data collection process to the live streaming process, and performing the push live streaming on the audio and video data based on the live streaming process.

6. The method according to claim 5, wherein the method further comprises:

controlling a microphone to collect other audio data; and sending the other audio data to the live streaming process;

performing the push live streaming on the audio and video data based on the live streaming process comprises:

fusing the audio and video data with the other audio data; and performing the push live streaming on the fused audio and video data based on the live streaming process.

7. The method according to claim 5, wherein sending the audio and video data from the first subroutine process to the live streaming process comprises:

packaging and/or compressing the audio and video data, and sending the processed audio and video data from the first subroutine process to the live streaming process.

8. A computer device, comprising a processor, a memory, and a bus, wherein the memory stores machine-readable instructions executable by the processor, the processor communicates with the memory through the bus when the computer device runs, and the machine-readable instructions, when executed by the processor, cause the processor to perform operations comprising:

implementing push live streaming on a first subroutine interface in response to an initiation by a streamer directly received via the first subroutine interface displayed in a target application associated with a live streaming process, wherein the implementing push live streaming on the first subroutine interface comprises directly obtaining video and audio data through a first subroutine process associated with the first subroutine interface;

receiving interactive data sent by a server, wherein the interactive data are sent to subroutine processes that have established connections with the live streaming process, and wherein the subroutine processes comprise the first subroutine process and a second subroutine process associated with a second subroutine interface;

displaying the interactive data on the first subroutine interface, wherein the interactive data comprise data sent from an audience to interact with the streamer;

determining whether a subroutine switching operation of switching the first subroutine interface to the second subroutine interface has been performed based on detecting a display status of the first subroutine interface and a display status of the second subroutine interface; and implementing uninterrupted display of the interactive data by directly displaying, on the second subroutine interface, the interactive data received through the second subroutine process in response to determining that the subroutine switching operation has been performed.

9. The computer device according to claim 8, wherein the live streaming method further comprises:

determining all activated subroutine processes before responding to the live streaming request initiated on the first subroutine interface displayed in the target application; and establishing a connection between the live streaming process and the activated subroutine processes to perform push live streaming on subroutine interfaces corresponding to the activated subroutine processes through the live streaming process;

sending the interactive data to subroutine processes having a connection relationship with the live streaming process comprises:

sending the interactive data to the activated subroutine processes.

10. The computer device according to claim 8, wherein after receiving the interactive data sent by the server, the live streaming method further comprises:

storing the interactive data in the live streaming process;

responding to activation of a third subroutine, and displaying a third subroutine interface; and sending the interactive data stored in the live streaming process to a third subroutine process to display the interactive data on the third subroutine interface.

11. The computer device according to claim 8, wherein the live streaming method further comprises:

detecting a display status of each currently activated subroutine interface, the display status being used to represent whether the subroutine interface is displayed;

determining a last pushed video frame when the display statuses of all subroutine interfaces are non-display; and performing the push live streaming based on the last pushed video frame.

12. The computer device according to claim 8, wherein performing push live streaming on the first subroutine interface based on the live streaming process comprises:

collecting audio and video data on the first subroutine interface based on an audio and video data collection process corresponding to a first subroutine; and sending the audio and video data from the audio and video data collection process to the live streaming process, and performing the push live streaming on the audio and video data based on the live streaming process.

13. The computer device according to claim 12, wherein the live streaming method further comprises:

controlling a microphone to collect other audio data; and sending the other audio data to the live streaming process;

performing the push live streaming on the audio and video data based on the live streaming process comprises:

fusing the audio and video data with the other audio data; and performing the push live streaming on the fused audio and video data based on the live streaming process.

14. The computer device according to claim 12, wherein sending the audio and video data from the first subroutine process to the live streaming process comprises:

packaging and/or compressing the audio and video data, and sending the processed audio and video data from the first subroutine process to the live streaming process.

15. A non-transitory computer-readable storage medium, wherein the computer-readable storage medium stores a computer program, and the computer program, when run by a processor, cause the processor to perform operations comprising:

implementing push live streaming on a first subroutine interface in response to an initiation by a streamer directly received via the first subroutine interface displayed in a target application associated with a live streaming process, wherein the implementing push live streaming on the first subroutine interface comprises directly obtaining video and audio data through a first subroutine process associated with the first subroutine interface;

receiving interactive data sent by a server, wherein the interactive data are sent to subroutine processes that have established connections with the live streaming process, and wherein the subroutine processes comprise the first subroutine process and a second subroutine process associated with a second subroutine interface;

displaying the interactive data on the first subroutine interface, wherein the interactive data comprise data sent from an audience to interact with the streamer;

determining whether a subroutine switching operation of switching the first subroutine interface to the second subroutine interface has been performed based on detecting a display status of the first subroutine interface and a display status of the second subroutine interface; and implementing uninterrupted display of the interactive data by directly displaying, on the second subroutine interface, the interactive data received through the second subroutine process in response to determining that the subroutine switching operation has been performed.

16. The non-transitory computer-readable storage medium according to claim 15, wherein the live streaming method further comprises:

determining all activated subroutine processes before responding to the live streaming request initiated on the first subroutine interface displayed in the target application; and establishing a connection between the live streaming process and the activated subroutine processes to perform push live streaming on subroutine interfaces corresponding to the activated subroutine processes through the live streaming process;

sending the interactive data to subroutine processes having a connection relationship with the live streaming process comprises:

sending the interactive data to the activated subroutine processes.

17. The non-transitory computer-readable storage medium according to claim 15, wherein after receiving the interactive data sent by the server, the live streaming method further comprises:

storing the interactive data in the live streaming process;

responding to activation of a third subroutine, and displaying a third subroutine interface; and sending the interactive data stored in the live streaming process to a third subroutine process to display the interactive data on the third subroutine interface.

18. The non-transitory computer-readable storage medium according to claim 15, wherein the live streaming method further comprises:

detecting a display status of each currently activated subroutine interface, the display status being used to represent whether the subroutine interface is displayed;

determining a last pushed video frame when the display statuses of all subroutine interfaces are non-display; and performing the push live streaming based on the last pushed video frame.

19. The non-transitory computer-readable storage medium according to claim 15, wherein performing push live streaming on the first subroutine interface based on the live streaming process comprises:

collecting audio and video data on the first subroutine interface based on an audio and video data collection process corresponding to a first subroutine; and sending the audio and video data from the audio and video data collection process to the live streaming process, and performing the push live streaming on the audio and video data based on the live streaming process.

20. The non-transitory computer-readable storage medium according to claim 19, wherein the live streaming method further comprises:

controlling a microphone to collect other audio data; and sending the other audio data to the live streaming process;

performing the push live streaming on the audio and video data based on the live streaming process comprises:

fusing the audio and video data with the other audio data; and performing the push live streaming on the fused audio and video data based on the live streaming process.

\* \* \* \* \*